(12) United States Patent
Allmendinger et al.

(10) Patent No.: US 6,705,300 B2
(45) Date of Patent: Mar. 16, 2004

(54) METHOD FOR OPEN-LOOP AND CLOSED-LOOP CONTROL OF THE NUMBER AND SEQUENCE OF STROKES IN THE MOTIVE PROCESS OF A RECIPROCATING-PISTON INTERNAL COMBUSTION ENGINE

(75) Inventors: Klaus Allmendinger, Bachhagel (DE); Karlheinz Baier, Ostfildern (DE); Hans-Hubert Hemberger, Notzingen (DE)

(73) Assignee: DaimlerChrysler AG, Stuttgart (DE)

( * ) Notice: Subject to any disclaimer, the term of this patent is extended or adjusted under 35 U.S.C. 154(b) by 35 days.

(21) Appl. No.: 10/207,460

(22) Filed: Jul. 29, 2002

(65) Prior Publication Data
US 2003/0024511 A1 Feb. 6, 2003

(30) Foreign Application Priority Data
Aug. 3, 2001 (DE) .......................................... 101 38 117

(51) Int. Cl.$^7$ ............................................... F02M 25/07
(52) U.S. Cl. .............................. 123/568.14; 123/568.15
(58) Field of Search ................... 123/295, 299, 123/300, 305, 90.15, 90.16, 90.17, 90.18, 568.14, 568.15, 568.21, 568.11; 60/272, 273, 274, 278

(56) References Cited

U.S. PATENT DOCUMENTS

| 4,700,684 A | * | 10/1987 | Pischinger et al. .... | 123/568.14 |
|---|---|---|---|---|
| 5,123,397 A | * | 6/1992 | Richeson ................ | 123/568.14 |
| 5,203,830 A | * | 4/1993 | Faletti et al. ........... | 123/568.14 |
| 6,105,550 A | * | 8/2000 | Nieberding ............ | 123/568.14 |
| 6,439,211 B1 | * | 8/2002 | Juretzka et al. ........ | 123/568.14 |
| 6,499,458 B1 | * | 12/2002 | Nieberding ............ | 123/568.14 |
| 6,612,294 B2 | * | 9/2003 | Hiraya et al. .......... | 123/568.14 |

FOREIGN PATENT DOCUMENTS

DE         196 31 799          1/1997

* cited by examiner

*Primary Examiner*—Willis R. Wolfe
(74) *Attorney, Agent, or Firm*—Kenyon & Kenyon

(57) ABSTRACT

In a method for open-loop and closed-loop control of the number and sequence of strokes in the motive process of a reciprocating-piston internal combustion engine, in particular a reciprocating-piston internal combustion engine with direct injection, it being possible, in the case of leaner-than-stoichiometric combustion, for the residual oxygen not yet used for combustion to be used for further working strokes, and a gas exchange occurring only after the residual oxygen in the combustion chamber has been completely burned or the air ratio $\lambda$ in the combustion chamber has fallen below a lower limiting value $\lambda_{grenz}$.

8 Claims, No Drawings

METHOD FOR OPEN-LOOP AND CLOSED-LOOP CONTROL OF THE NUMBER AND SEQUENCE OF STROKES IN THE MOTIVE PROCESS OF A RECIPROCATING-PISTON INTERNAL COMBUSTION ENGINE

CROSS-REFERENCE TO RELATED APPLICATIONS

The present application claims foreign priority to Application No. 101 38 117.4, filed in the Federal Republic of Germany on Aug. 3, 2001, which is expressly incorporated herein in its entirety be reference thereto.

1. Field of the Invention

The present invention provides a method for open-loop and closed-loop control of the number and sequence of strokes in the motive process of a reciprocating-piston internal combustion engine, in particular a reciprocating-piston internal combustion engine with direct injection, and a reciprocating-piston internal combustion engine.

2. Background Information

Certain internal combustion engines with direct injection are operated in lean mode in certain engine-speed and load ranges, i.e. with an air ratio $\lambda$ greater than 1. This applies particularly to compression-ignition internal combustion engines with direct injection, which can be operated with a large excess of air over a wide engine-speed range.

German Published Patent Application No. 196 31 799 describes a reciprocating-piston internal combustion engine with 6 working strokes and a variable valve timing system, which is operated with 4 strokes during a warm-up phase and with 6 strokes once the operating temperature has been reached. In this arrangement, the number of strokes can be varied only between 4- and 6-stroke mode, the combustion products being expelled from the combustion chamber of the cylinder during the fourth stroke in each case. The fifth stroke is a working stroke, at the beginning of which water is injected into the cylinder in order to produce in the cylinder, which is still hot from the preceding combustion, steam in which the steam pressure continues to move the piston. The sixth stroke is used to expel the steam.

The disadvantage with this method is that the number of strokes of the internal combustion engine can only be varied between two values. The combustion products are expelled from the cylinder at the latest during the sixth stroke, whether or not they contain components that could still burn or residual oxygen. As a result, some of the residual oxygen that could still be used in the cylinder may be lost. Since power losses occur with each gas exchange due to valve movements and flows, premature gas exchange processes have a negative effect on the efficiency of the internal combustion engine.

SUMMARY

It is an object of the present invention to provide a method in which the efficiency of an internal combustion engine operated by the method is increased.

The above and other beneficial objects of the present invention are achieved by providing a method and an engine as described herein.

With the aid of the method according to the present invention, the residual oxygen which is still present in the combustion gas after an initial working stroke, especially in the case of combustion processes with an excess of air, is used in a carefully controlled manner for further working strokes without the need for further gas exchanges for this purpose, thereby reducing gas exchange losses. The combustion gas is expelled and a new charge of fresh gas is introduced only when the residual oxygen in the combustion chamber has been completely burnt by repeated working strokes. The number of successive working strokes is variable and depends on the respective proportion of oxygen or air in the combustion chamber.

Relatively high nitrogen oxide emissions ($NO_x$) occur during lean combustion, and these may have to be converted into harmless exhaust gases by exhaust gas-purification systems such as, for example, $DENO_x$ catalysts. With the repeated combustion and expansion in accordance with the method of the present invention, in contrast, unwanted $NO_x$ components in the exhaust gas may be reduced by the reaction of the nitrogen oxide/oxygen component with the fuel just injected without further aftertreatment of the exhaust gas.

DETAILED DESCRIPTION

According to a exemplary embodiment of the invention, a method is used with a compression-ignition internal combustion engine with direct fuel injection, which includes a plurality of reciprocating pistons guided in a linear manner in cylinders and inlet and exhaust valves. The motive process then occurs in a cycle with the following steps, at least in phases in which the air ratio $\lambda$ is greater than 1:

Fresh air is drawn into the combustion chamber as part of the intake stroke after the prior opening of at least one inlet valve. In the course of the compression stroke, the fresh air drawn in is then compressed. Fuel may be injected when the reciprocating piston is in the region of top dead center (OT), which is followed by the compression-ignition of the fuel/air mixture and subsequent expansion.

Instead of then expelling the exhaust gases, the exhaust valve remains closed and a new compression stroke is performed by the rising reciprocating piston to compress the combustion gas together with the unburned oxygen component. At the injection point in the region of top dead center, fuel is once again injected and, as part of a new working stroke, burns with the residual oxygen or some of the latter. If the air ratio $\lambda$ is sufficiently high, further working strokes may follow. In the case of an air ratio of $\lambda=4$, three further working strokes are theoretically possible after the first working stroke. A gas exchange is initiated by opening the inlet valve and the exhaust valve only if the residual oxygen in the combustion chamber has been burned completely or the air ratio $\lambda$ in the combustion chamber has reached a lower limiting value $\lambda_{grenz}$. The air ratio $\lambda$ in the combustion chamber may be measured directly or indirectly after every working stroke, for which purpose there is a corresponding sensor device.

Consequently, according to the method of the present invention, there is a cyclic alternation between the customary 4-stroke method (intake, compression, power, expansion) and a 2-stroke method, which is distinguished by compression and expansion of the combustion gas containing residual oxygen, for a steady-state rotational-speed or load point of the characteristic of the internal combustion engine, depending on the instantaneous air ratio $\lambda$.

The quantity of fuel injected may be metered in each case as a function of the unburned oxygen instantaneously present in the combustion chamber. Since the number and type of strokes in the operating method according to the present invention are variable, a variable valve timing system may be provided, e.g. an electromagnetic valve timing system with selective valve shutdown, the use of electrohydraulic switchable bucket tappets also being possible. An open-loop and/or closed-loop control device, which is supplied with the measured instantaneous air ratio $\lambda$ as an input variable is used for variable activation of the valves.

What is claimed is:

1. A method for open-loop and closed-loop control of a number and sequence of strokes in a motive process of a reciprocating-piston internal combustion engine, at least in phases in which an air ratio is greater than 1, comprising the steps of:
   a) inducing fresh air into a combustion chamber after a prior opening of at least one inlet valve;
   b) compressing the fresh air drawn in;
   c) injecting fuel directly into the air to form a fuel/air mixture;
   d) igniting the fuel/air mixture by one of applied and compression ignition followed by subsequently expanding the fuel/air mixture;
   e) compressing one of a completely and a partially burned charge that remains completely in the combustion chamber;
   f) injecting fuel into the combustion chamber as a charge;
   g) igniting the charge by one of applied- and compression ignition and subsequent expansion of the charge;
   h) expelling the charge from the combustion chamber after prior opening of at least one exhaust valve in accordance with and for as long as one of unburned oxygen being in the combustion chamber and an air ratio falling below a lower limiting value; and
   i) repeating steps e, f, g and h.

2. The method according to claim 1, wherein the engine includes a reciprocating-piston internal combustion engine with direct injection.

3. The method according to claim 1, further comprising the steps of:
   measuring the air ratio in the combustion chamber one of directly and indirectly;
   using residual oxygen not used for combustion for further working strokes in accordance with a leaner-than-stoichiometric combustion; and
   performing a gas exchange only after one of the residual oxygen in the combustion chamber has been completely burned and the air ratio in the combustion chamber has fallen below the lower limiting value.

4. The method according to claim 1, wherein at least one of the injecting steps includes the substep of metering a quantity of fuel a function of unburned oxygen instantaneously present in the combustion chamber.

5. A reciprocating-piston internal combustion engine, comprising:
   at least one of an open-loop and closed-loop control device configured to control a number and sequence of strokes in a motive process, the control device configured to subject the motive process to at least one of an open-loop and a closed-loop control so that, at least in phases in which an air ratio is greater than 1, in a leaner-than-stoichiometric combustion, residual oxygen not used in combustion is usable for further working strokes, a gas exchange configured to occur only after one of the residual oxygen in a combustion chamber has been completely burned and the air ratio in the combustion chamber has fallen below a lower limiting value.

6. The reciprocating-piston internal combustion engine according to claim 5, wherein the engine includes a reciprocating-piston internal combustion engine with direct injection.

7. The reciprocating-piston internal combustion engine according to claim 5, further comprising inlet and exhaust valves configured to be activated in a variable manner by the control device.

8. The reciprocating-piston internal combustion engine according to claim 5, further comprising at least one sensor configured to measure the air ratio in the combustion chamber one of directly and indirectly.

* * * * *